(12) United States Patent
Yang et al.

(10) Patent No.: US 10,415,946 B2
(45) Date of Patent: Sep. 17, 2019

(54) WHEEL CENTER HOLE SIZE QUALIFICATION DETECTION DEVICE

(71) Applicant: CITIC Dicastal CO.,LTD., Qinhuangdao, Hebei (CN)

(72) Inventors: Jinling Yang, Qinhuangdao (CN); Li Yang, Qinhuangdao (CN); Weidong Liu, Qinhuangdao (CN)

(73) Assignee: CITIC Dicastal CO., LTD., Hebei (CN)

(*) Notice: Subject to any disclaimer, the term of this patent is extended or adjusted under 35 U.S.C. 154(b) by 213 days.

(21) Appl. No.: 15/688,903

(22) Filed: Aug. 29, 2017

(65) Prior Publication Data

US 2018/0356199 A1 Dec. 13, 2018

(30) Foreign Application Priority Data

Jun. 13, 2017 (CN) .......................... 2017 1 0442613

(51) Int. Cl.
*G01B 3/50* (2006.01)
*G01B 3/12* (2006.01)
*G01B 5/12* (2006.01)

(52) U.S. Cl.
CPC ............... *G01B 3/50* (2013.01); *G01B 3/12* (2013.01); *G01B 5/12* (2013.01)

(58) Field of Classification Search
CPC ...... G01B 5/12; G01B 11/0691; G01B 21/08; G01B 3/12; G01B 3/22; G01B 3/50; G01B 5/0002; G01B 5/0025; G01B 5/20
USPC ...................................... 33/203.12
See application file for complete search history.

(56) References Cited

U.S. PATENT DOCUMENTS

| 5,692,811 | A  | * | 12/1997 | Rogers | ................... | B60B 3/145 |
| | | | | | | 301/105.1 |
| 10,234,275 | B1 | * | 3/2019 | Liu | ..................... | G01B 11/0691 |
| 2002/0189114 | A1 | * | 12/2002 | Voeller | ................... | G01B 5/255 |
| | | | | | | 33/203.18 |
| 2018/0356199 | A1 | * | 12/2018 | Yang | ........................ | G01B 3/50 |

FOREIGN PATENT DOCUMENTS

| CN | 203791670 U | 8/2014 |
| CN | 203798286 U | 8/2014 |
| CN | 204639163 U | 9/2015 |
| CN | 105890496 A | 8/2016 |
| JP | H10122802 A | 5/1998 |

* cited by examiner

*Primary Examiner* — Yaritza Guadalupe-McCall
(74) *Attorney, Agent, or Firm* — Cooper Legal Group, LLC

(57) ABSTRACT

Disclosed is a wheel center hole size qualification detection device. The upper ends of large guide posts are connected with an upper cross beam, the lower ends of the large guide posts are connected with a lower cross beam, a frame is fixed on a foundation via bases, the large guide posts are arranged in large guide sleeves on the frame, a large cylinder is fixed on the foundation and connected with the lower cross beam, the large cylinder drives an overall framework formed by the upper cross beam, the lower cross beam and the large guide posts to move up and down, small guide posts are respectively fixed on two sides of the center of the upper cross beam and inside the large guide posts, small cylinders are fixed below the frame, and clamping jaws are connected with the small cylinders.

1 Claim, 1 Drawing Sheet

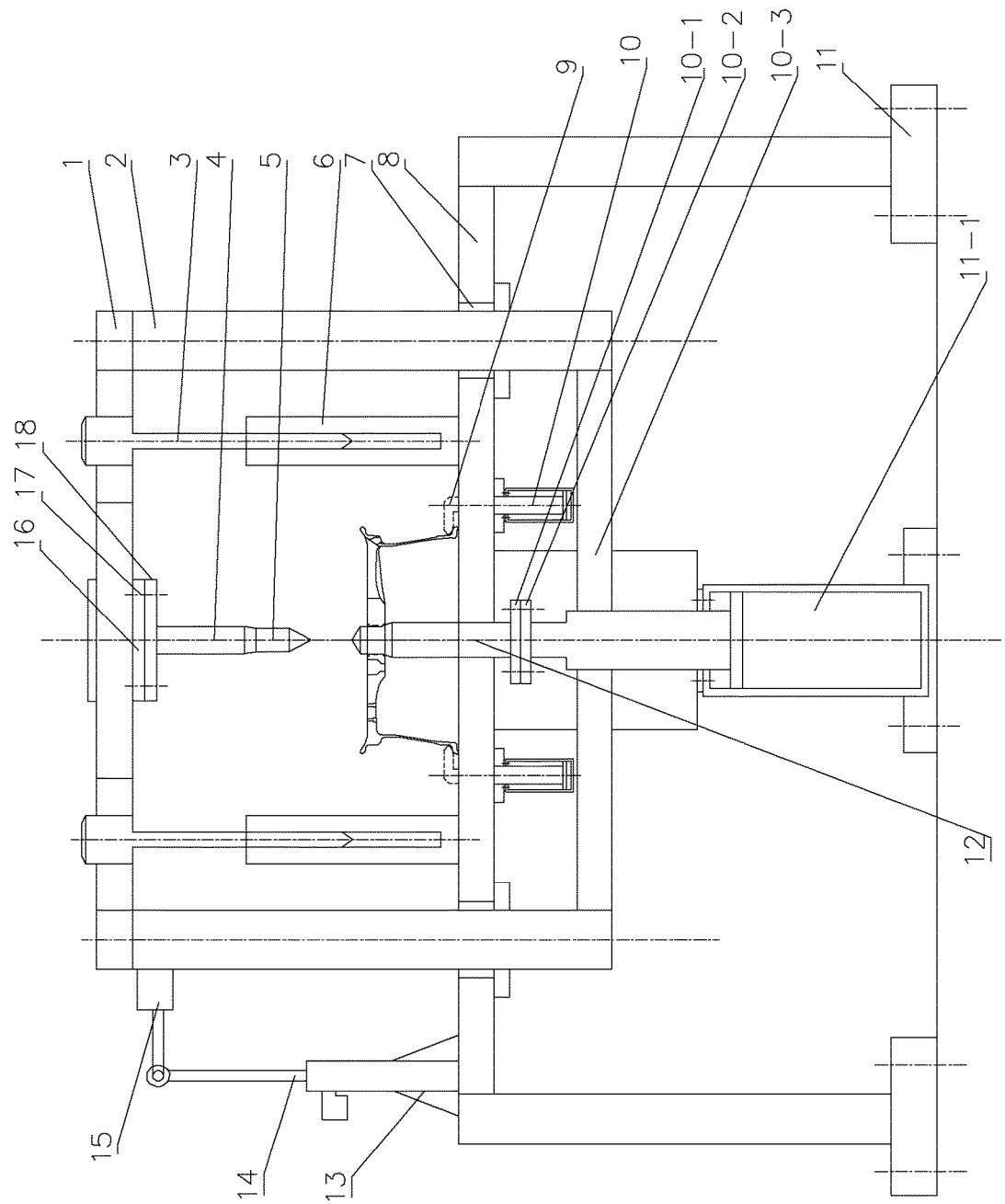

WHEEL CENTER HOLE SIZE QUALIFICATION DETECTION DEVICE

CROSS-REFERENCE TO RELATED APPLICATIONS

This application is filed based upon and claims priority to Chinese Patent Application No. 201710442613.4, filed on Jun. 13, 2017, the entire contents of which are incorporated herein by reference.

TECHNICAL FIELD

The present disclosure relates to a detection device, specifically to a wheel center hole size qualification detection device.

BACKGROUND

The center hole of a wheel is directly matched with a main shaft of an automobile, so the size of the center hole is always strictly controlled in the machining process of the wheel; in the traditional control method, a worker holds a go-no go gauge to detect the size completely; however, since the automatic production mode is continually improved, this detection mode cannot adapt to modern production anymore; and therefore, an automatic detection device is needed to meet the full automatic online detection requirement of the key size.

SUMMARY

The present disclosure is aimed at providing a wheel center hole detection device capable of automatically detecting the size of a center hole of a wheel on line.

A wheel center hole size qualification detection device includes an upper cross beam, large guide posts, small guide posts, a central go-no go gauge no go end, a central go-no go gauge go end, small guide sleeves, large guide sleeves, a frame, clamping jaws, small cylinders, a connecting flange A, a connecting flange B, a lower cross beam, bases, a large cylinder, a central positioning pin, a mobile sensor support, a mobile sensor, a detection connecting rod, a shim plate, connecting bolts and a fixing plate.

The upper ends of the large guide posts are connected with the upper cross beam, the lower ends of the large guide posts are connected with the lower cross beam, the frame is fixed on a foundation via the bases, the large guide posts are arranged in the large guide sleeves on the frame, the large cylinder is fixed on the foundation and connected with the lower cross beam, the large cylinder drives an overall framework formed by the upper cross beam, the lower cross beam and the large guide posts to move up and down, the small guide posts are respectively fixed on two sides of the center of the upper cross beam and inside the large guide posts, the small cylinders are fixed below the frame, and the clamping jaws are connected with the small cylinders. The connecting flange B is fixedly connected with the connecting flange A, and a piston rod of the large cylinder 11-1 moves up and down to drive the flange A 10-1 and the central positioning pin 12 to move up and down.

The mobile sensor support 13 is fixed on the frame 8. The mobile sensor 14 is fixed on the mobile sensor support 13, the detection connecting rod 15 is fixed on the left large guide post 2, the central go-no go gauge 4 is fixed in the fixing plate 18, and the fixing plate 18 is connected with the shim plate 16 via the connecting bolts 17. The shim plate 16 is fixed below the upper cross beam 1.

In practical use, the piston rod of the cylinder ascends and drives the overall framework formed by the upper cross beam, the lower cross beam and the large guide posts to move up; after a robot clamps a wheel and positions the center hole of the wheel in the central positioning pin, the piston rod of the cylinder descends under the action of compressed air, and the small cylinders drive the clamping jaws to clamp the wheel. The piston rod of the cylinder descends and drives the overall framework formed by the upper cross beam, the lower cross beam and the large guide posts to move down, and after the central positioning pin is driven to fall, a cone head of the central go-no go gauge go end enters the center hole of the wheel first, then the central go-no go gauge go end enters the center hole of the wheel, and the central go-no go gauge no go end enters the center hole of the wheel, in which the whole process is controlled by a PLC (Programmable Logic Controller), and a display only displays qualification or disqualification. When the go-no go gauge go end passes through the center hole of the wheel, that is, arrives at the depth set by a computer program, the mobile sensor transmits a signal to a computer to judge that the go end of the center hole of the wheel is qualified; otherwise, it is judged as unqualified, and indicates that the center hole of the wheel is relatively small. When the go-no go gauge no go end passes through the center hole of the wheel, that is, arrives at the depth set by the computer program, the mobile sensor transmits a signal to the computer to judge that the no go end of the center hole of the wheel is unqualified; otherwise, it is judged as qualified, and indicates that the center hole of the wheel is relatively large. The whole process is controlled by the PLC, qualification displayed on the display is set by the computer program only when both the go end and the no go end are qualified, and if one is unqualified, it is also displayed on the display that the go end is relatively small or the no go end is relatively large. That is, the center hole of the wheel is unqualified.

The device in use can meet the requirement of wheel center hole size qualification detection; a wheel is accurately positioned by the positioning pin and the double sets of left and right limiting guide posts and guide sleeves, and then clamped and tested, so that the device has the characteristics of practical structure, high measurement precision, high efficiency, high working safety and reliability and the like.

BRIEF DESCRIPTION OF THE DRAWINGS

FIG. 1 is a schematic diagram of a wheel center hole size qualification detection device.

LIST OF REFERENCE NUMERALS 1 upper cross beam
2 large guide post
3 small guide post
4 central go-no go gauge no go end
5 central go-no go gauge go end
6 small guide sleeve
7 large guide sleeve
8 frame
9 clamping jaw
10 small cylinder
10-1 connecting flange A
10-2 connecting flange B
10-3 lower cross beam 11 base
11-1 large cylinder
12 central positioning pin
13 mobile sensor support
14 mobile sensor
15 detection connecting rod
16 shim plate
17 connecting bolt
18 fixing plate

DETAILED DESCRIPTION

The details and working conditions of the specific device provided by the present disclosure will be illustrated in detail below in combination with the accompanying drawing.

A wheel center hole size qualification detection device includes an upper cross beam 1, large guide posts 2, small guide posts 3, a central go-no go gauge no go end 4, a central go-no go gauge go end 5, small guide sleeves 6, large guide sleeves 7, a frame 8, clamping jaws 9, small cylinders 10, a connecting flange A 10-1, a connecting flange B 10-2, a lower cross beam 10-3, bases 11, a large cylinder 11-1, a central positioning pin 12, a mobile sensor support 13, a mobile sensor 14, a detection connecting rod 15, a shim plate 16, connecting bolts 17 and a fixing plate 18.

The upper ends of the large guide posts 2 are connected with the upper cross beam 1, the lower ends of the large guide posts 2 are connected with the lower cross beam 10-3, the frame 8 is fixed on a foundation via the bases 11, the large guide posts 2 are arranged in the large guide sleeves 7 on the frame 8, the large cylinder 11-1 is fixed on the foundation and connected with the lower cross beam 10-3, the large cylinder 11-1 drives an overall framework formed by the upper cross beam 1, the lower cross beam 10-3 and the large guide posts 2 to move up and down, the small guide posts 3 are respectively fixed on two sides of the center of the upper cross beam 1 and inside the large guide posts 2, the small cylinders 10 are fixed below the frame 8, and the clamping jaws 9 are connected with the small cylinders 10. The connecting flange B 10-2 is fixedly connected with the connecting flange A 10-1, and a piston rod of the large cylinder 11-1 moves up and down to drive the flange A 10-1 and the central positioning pin 12 to move up and down.

The mobile sensor support 13 is fixed on the frame 8. The mobile sensor 14 is fixed on the mobile sensor support 13, the detection connecting rod 15 is fixed on the left large guide post 2, the central go-no go gauge 4 is fixed in the fixing plate 18, and the fixing plate 18 is connected with the shim plate 16 via the connecting bolts 17. The shim plate 16 is fixed below the upper cross beam 1.

In practical use, the piston rod of the cylinder 11-1 ascends and drives the overall framework formed by the upper cross beam 1, the lower cross beam 10-3 and the large guide posts 2 to move up; and after a robot clamps a wheel and positions the center hole of the wheel in the central positioning pin 12, the piston rod of the cylinder 11-1 descends under the action of compressed air, and the small cylinders 10 drive the clamping jaws 9 to clamp the wheel. The piston rod of the cylinder 11-1 descends and drives the overall framework formed by the upper cross beam 1, the lower cross beam 10-3 and the large guide posts 2 to move down, and after the central positioning pin 12 is driven to fall, a cone head of the central go-no go gauge go end 5 enters the center hole of the wheel first, then the central go-no go gauge go end 5 enters the center hole of the wheel, and the central go-no go gauge no go end 4 enters the center hole of the wheel, in which the whole process is controlled by a PLC, and a display only displays qualification or disqualification. When the go-no go gauge go end 5 passes through the center hole of the wheel, that is, arrives at the depth set by a computer program, the mobile sensor 14 transmits a signal to a computer to judge that the go end of the center hole of the wheel is qualified; otherwise, it is judged as unqualified, and indicates that the center hole of the wheel is relatively small. When the go-no go gauge no go end 4 passes through the center hole of the wheel, that is, arrives at the depth set by the computer program, the mobile sensor 14 transmits a signal to the computer to judge that the no go end of the center hole of the wheel is unqualified; otherwise, it is judged as qualified, and indicates that the center hole of the wheel is relatively large. The whole process is controlled by the PLC, qualification displayed on the display is set by the computer program only when both the go end and the no go end are qualified, and if one is unqualified, it is also displayed on the display that the go end is relatively small or the no go end is relatively large. That is, the center hole of the wheel is unqualified.

What is claimed is:

1. A wheel center hole size qualification detection device, comprising an upper cross beam, large guide posts, small guide posts, a central go-no go gauge no go end, a central go-no go gauge go end, small guide sleeves, large guide sleeves, a frame, clamping jaws, small cylinders, a connecting flange A, a connecting flange B, a lower cross beam, bases, a large cylinder, a central positioning pin, a mobile sensor support, a mobile sensor, a detection connecting rod, a shim plate, connecting bolts and a fixing plate, wherein
the upper ends of the large guide posts are connected with the upper cross beam, the lower ends of the large guide posts being connected with the lower cross beam, the frame being fixed on a foundation via the bases, the large guide posts being arranged in the large guide sleeves on the frame, the large cylinder being fixed on the foundation and connected with the lower cross beam, the large cylinder driving an overall framework formed by the upper cross beam, the lower cross beam and the large guide posts to move up and down, the small guide posts being respectively fixed on two sides of the center of the upper cross beam and inside the large guide posts, the small cylinders being fixed below the frame, and the clamping jaws being connected with the small cylinders; the connecting flange B being fixedly connected with the connecting flange A, and a piston rod of the large cylinder moving up and down to drive the flange A and the central positioning pin to move up and down;
the mobile sensor support being fixed on the frame; the mobile sensor being fixed on the mobile sensor support, the detection connecting rod being fixed on the left large guide post, the central go-no go gauge being fixed in the fixing plate, and the fixing plate being connected with the shim plate via the connecting bolts; and the shim plate being fixed below the upper cross beam.

\* \* \* \* \*